(12) United States Patent
Yanai

(10) Patent No.: US 8,040,473 B2
(45) Date of Patent: Oct. 18, 2011

(54) MULTILAYER BLACK-MATRIX-EQUIPPED FILTER AND LIQUID CRYSTAL DISPLAY

(75) Inventor: Yujiro Yanai, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 526 days.

(21) Appl. No.: 12/086,744

(22) PCT Filed: Dec. 21, 2006

(86) PCT No.: PCT/JP2006/326179
§ 371 (c)(1),
(2), (4) Date: Jun. 19, 2008

(87) PCT Pub. No.: WO2007/072998
PCT Pub. Date: Jun. 28, 2007

(65) Prior Publication Data
US 2009/0059140 A1 Mar. 5, 2009

(30) Foreign Application Priority Data

Dec. 21, 2005 (JP) .................... 2005-368325
Dec. 22, 2005 (JP) .................... 2005-370313

(51) Int. Cl.
*G02F 1/1333* (2006.01)
(52) U.S. Cl. ........................................ 349/110
(58) Field of Classification Search .................. 349/110, 349/111; 359/614, 893
See application file for complete search history.

(56) References Cited

U.S. PATENT DOCUMENTS

| 5,666,177 | A | * | 9/1997 | Hsieh et al. | 349/111 |
| 6,128,057 | A | | 10/2000 | Suzuki et al. | |
| 6,501,527 | B1 | | 12/2002 | Hirose et al. | |
| 6,639,638 | B1 | * | 10/2003 | Kodnani et al. | 349/110 |
| 2004/0157141 | A1 | * | 8/2004 | Ito | 430/7 |
| 2004/0201796 | A1 | * | 10/2004 | Yun et al. | 349/96 |
| 2006/0250676 | A1 | * | 11/2006 | Hagood | 359/296 |

FOREIGN PATENT DOCUMENTS

JP  62-9301 A  1/1987
JP  9-244014 A  9/1997

(Continued)

OTHER PUBLICATIONS

International Search Report and Written Opinion of the International Search Authority.

(Continued)

*Primary Examiner* — Mark Robinson
*Assistant Examiner* — Michael Inadomi
(74) *Attorney, Agent, or Firm* — Buchanan Ingersoll & Rooney PC

(57) ABSTRACT

A black-matrix-equipped filter including a black matrix adapted to selectively shield light being incident from a light introduction side, and to transmit the unshielded light to a light output side, wherein the black matrix includes: a light shielding layer; and a first reflection inhibition layer formed at the light introduction side of the light shielding layer.

10 Claims, 10 Drawing Sheets

FOREIGN PATENT DOCUMENTS

| | | |
|---|---|---|
| JP | 10-73717 A | 3/1998 |
| JP | 10-197713 A | 7/1998 |
| JP | 10-288703 A | 10/1998 |
| JP | 2000-19490 A | 1/2000 |
| JP | 2000-28815 A | 1/2000 |
| JP | 2000-275429 A | 10/2000 |
| JP | 2001-83524 A | 3/2001 |
| JP | 2002-198184 A | 7/2002 |
| JP | 2004-240039 A | 8/2004 |
| JP | 2004-317897 A | 11/2004 |
| JP | 2005-128422 A | 5/2005 |
| JP | 2005-263920 | 9/2005 |
| JP | 2005-283668 A | 10/2005 |
| JP | 2005-283673 A | 10/2005 |
| JP | 2005-292329 A | 10/2005 |
| JP | 2006-337935 A | 12/2006 |

OTHER PUBLICATIONS

English-language Abstract of JP 2004-240039 A.
English-language Abstract of JP 62-009301 A.
"Color TFT Liquid Crystal Display", Apr. 10, 1997, pp. 218-220, published by Kyoritsu Shuppan Co., Ltd.
Official Action dated Mar. 1, 2011, issued by the Japanese Patent Office in corresponding Japanese Patent Application No. 2005-368325, and English language translation of the Official Action.
Official Action dated Mar. 1, 2011, issued by the Japanese Patent Office in corresponding Japanese Patent Application No. 2005-370313, and English language translation of the Official Action.

* cited by examiner

MULTILAYER BLACK-MATRIX-EQUIPPED FILTER AND LIQUID CRYSTAL DISPLAY

TECHNICAL FIELD

The present invention relates to a black-matrix-equipped filter adapted to selectively shield light, which is incident from a light introduction side, and to transmit the unshielded light to a light output side, and also relates to a liquid crystal display using the black-matrix-equipped filter. More particularly, the present invention relates to improved techniques for preventing a malfunction of a thin film transistor (TFT) from being caused by irradiating internal reflection light thereonto.

BACKGROUND ART

A color filter used in a color liquid crystal display, which is currently extremely widespread, is configured so that colored pixel layers R, G, and B (respectively corresponding to red, green, and blue) are formed on a transparent substrate, and that a black matrix is formed on each of the gaps between adjacent ones of the colored pixels R, G, and B so as to enhance display contrast. Especially, in a liquid crystal display device of the active matrix driving type using TFTs, the black matrix is used to prevent picture quality from being degraded due to an electric current leakage caused by irradiating light onto the TFTs. In recent years, a high optical density (O.D.), which is equal to or higher than 4.0, has been demanded for the black matrix so as to enhance the display contrast of a displayed image. On the other hand, the surface smoothness of the color filter is reduced by increasing the thickness of the black matrix. Thus, it is necessary that the black matrix is formed like a thin film.

Hitherto, a metallic thin film has been used to manufacture a black matrix for a display device, which has a high light shieldability. The black matrix is manufactured by performing the following method (see "Color TFT Liquid Crystal Display", published by Kyoritsu Shuppan Co., Ltd., Apr. 10, 1997, pp. 218 to 220.). That is, a photoresist is applied onto a metallic thin film made of a metal such as chrome, which is formed by performing an evaporation process or a sputtering process. Subsequently, the photoresist is exposed and developed using a photomask having a light shielding film pattern for a display device. Then, the exposed metallic thin film is etched. Finally, the photoresist remaining on the metallic thin film is peeled and removed to form the black matrix.

This method uses a metallic thin film. Thus, even in a case where the thickness of the film is small, a high light shielding effect is obtained. However, this method requires a vacuum film formation step of performing the evaporation process or the sputtering process, and also requires an etching step. Thus, this method has a problem in that the cost of the black matrix is high. Additionally, because the metallic film is used, the reflectance of the film is extremely high. Thus, this method has another problem in that the display contrast is low under strong external light. On the other hand, a method using a low reflectance chrome film (including, for example, two layers respectively made of metallic chrome and chromic oxide) has been proposed. However, because waste liquid containing metallic ions is discharged in the etching step, this method has a major problem in that an environmental load is large. Especially, chrome, which is most frequently used, is harmful and has a very large environmental load. Recently, as implied by EU directives such as ELV and RoHS, there has been increased public concern about reduction in the environment load. A metal material to be substituted for chrome has been proposed.

Meanwhile, one of techniques of obtaining a black matrix, whose environment load is small, is a technique using carbon black (see, for example, JP-A-62-9301 (the term "JP-A" as used herein means an "unexamined published Japanese patent application")). According to this technique, as shown in FIG. 7, a photosensitive resin composition containing carbon black is applied onto a substrate 1. This applied layer is dried. Then, a black matrix BM is obtained by exposing and developing the dried layer. However, the optical density of a unit application amount of carbon black is low. Thus, to obtain a high light-shieldability and a high optical density, the thickness t of the film is necessarily increased.

In the case of using carbon black, when an optical density of, for example, 4.0, which is equivalent to that of the metallic film, is ensured, the thickness of the film should be 1.2 μm to 1.5 μm. Therefore, in a case where RGB pixels are formed after the black matrix BM is formed, sometimes, boundary parts of adjacent colored pixels R and G expand as projected portions 3, 3, for example, as shown in FIG. 7. In a color filter 5 the planarity and smoothness of which are impaired, external light passes through the projected portion 3 around the black matrix and causes leakage of light from a thin film transistor (TFT) due to irradiation of light thereonto. Consequently, the technique using carbon black has problems in that picture quality is degraded, and that light from a backlight light source is incident from a side part of the projected portion 3 to thereby degrade display quality.

A method using metal microparticles instead of carbon black is known as a method of obtaining a black matrix that has a small environment load and a high optical density and that is formed as a thin film, in view of the above problems (see, for example, JP-A-2004-240039). According to this method, a black matrix, which has a small environment load and a high optical density and which is formed as a thin film, can be obtained, as compared with the method of forming a metallic thin film.

In the case of a black-matrix-equipped filter formed using metal microparticles, the film thickness of the black matrix can be reduced, as compared with the case of forming a black matrix using carbon black. Also, in the case of a filter with a black matrix formed using metal microparticles, the environment load can be reduced, as compared the case of forming a black matrix using a metal thin film.

DISCLOSURE OF THE INVENTION

However, even in the case of the black matrix formed using metal microparticles, the reflectance of the film is high. Thus, especially, in the case of a flat display device having a liquid crystal panel disposed between a black-matrix-equipped filter and a backlight light source, when light transmitted by the liquid crystal panel from the backlight light source is incident from a light introduction side of the filter, the incident light is sometimes reflected by a light introduction side surface of the black matrix toward the liquid crystal panel therefrom. It is expected that when such an internal reflection occurs, a malfunction of a TFT provided in the liquid crystal panel due to light irradiation is caused. Such a problem becomes prominent in a case where a backlight light source is used to increase brightness.

The invention is accomplished in view of the above circumstances. An object of the invention is to provide a black-matrix-equipped filter enabled to prevent light, which has been incident from a light introduction side, from being reflected by the black matrix and from being outputted from the light introduction side again. Another object of the invention is to provide a liquid crystal display employing the blackmatrix-equipped filter. Thus, a malfunction of a TFT, to which internal reflection light is irradiated, is prevented from occurring. Consequently, the display quality of the liquid crystal panel can be enhanced.

The black-matrix-equipped filter according to the invention includes a black matrix adapted to selectively shield light, which is incident from a light introduction side, and to transmit the unshielded light to a light output side. This black matrix includes the light shielding layer and the first reflection inhibition layer formed at the light introduction side of the light shielding layer. Thus, when light having been incident from the light output side impinges upon the black matrix, the incident light is inhibited by the first reflection inhibition layer formed at the light introduction side of the light shielding layer from being reflected. Also, an internal reflection, by which the light having been incident from the light introduction side is outputted again from the light introduction side, can be prevented.

The liquid crystal display according to the invention is configured so that the black-matrix-equipped filter is disposed opposite to the backlight light source across the liquid crystal panel. Thus, when light having been incident from the light output side impinges upon the black matrix of the black-matrix-equipped filter, the incident light is inhibited by the first reflection inhibition layer formed at the light introduction side of the light shielding layer from being reflected. Also, an amount of reflection light to be irradiated onto the TFT provided on the liquid crystal panel is reduced. Consequently, a malfunction of the TFT, which is caused by irradiating backlight light onto the TFT through the light shielding layer as internal reflection light, can be prevented. Also, the display quality of the liquid crystal panel can be enhanced.

(1) According to a first aspect of the present invention, a black-matrix-equipped filter includes a black matrix adapted to selectively shield light being incident from a light introduction side, and to transmit the unshielded light to a light output side, wherein the black matrix includes: a light shielding layer; and a first reflection inhibition layer formed at the light introduction side of the light shielding layer.

According to this black-matrix-equipped filter, when light having been incident from a light output side impinges upon the black matrix, reflection of this incident light is inhibited by the first reflection inhibition layer formed at the light introduction side of the light shielding layer. That is, occurrence of the internal reflection, by which light having been incident from the light introduction side is again outputted from the light introduction side, can be inhibited. Consequently, in a case where a liquid crystal panel is provided between the black-filter-equipped filter and the backlight light source, light transmitted by the liquid crystal panel from the backlight light source can be inhibited from being reflected by the black matrix, with which the filter is equipped, and from being irradiated onto a TFT of the liquid crystal panel.

(2) The black-matrix-equipped filter according to the item (1), wherein the black matrix includes a second reflection inhibition layer provided at the light output side of the light shielding layer.

According to this black-matrix-equipped filter, even in a case where the light shielding layer is a metal film, the high reflectance of the metal film is reduced by the second reflection inhibition layer by forming the second reflection inhibition layer at the light output side of the light shielding layer. Thus, high display contrast can be obtained even under external light.

(3) The black-matrix-equipped filter according to the item (1) or (2), wherein the reflection inhibition layer includes a light absorbing material.

According to this black-matrix-equipped filter, the reflection inhibition layer formed at the light introduction side of the black matrix is made of a light absorbing material. Thus, when light coming from, for example, the backlight light source is irradiated from the light introduction side onto the black matrix, the irradiated light is absorbed by the light absorbing material and is attenuated during passing through the light absorbing material. The light reaching the light shielding layer with not being absorbed perfectly is reflected. This reflection light is partly absorbed and is attenuated during passing through the light absorbing material again. Consequently, the light irradiated onto the black matrix from the light introduction side is inhibited from being reflected.

(4) The black-matrix-equipped filter according to the item (3), wherein the light absorbing material is one of carbon black and a mixture including the carbon black.

According to this black-matrix-equipped filter, carbon black or a mixture including carbon black is used as the light absorbing material. Thus, fine carbon particles, which are 5 nm to 500 nm in diameter, are kneaded and applied. Consequently, a high-density high-precision (or high-resolution) light absorbing film can easily be formed at low cost.

(5) The black-matrix-equipped filter according to any one of the items (1) to (4), wherein the light shielding layer includes metal microparticles.

According to this black-matrix-equipped filter, a film thickness is large, and a high light-shieldability can be obtained, as compared with the filter in which the black matrix includes carbon black.

(6) The black-matrix-equipped filter according to the item (5), wherein the light shielding layer is configured to disperse the metal microparticles in a binder to be able to shield light.

According to this black-matrix-equipped filter, a light shielding layer can be formed by simple coating to which a printing technique is applied.

(7) The black-matrix-equipped filter according to the item (6), wherein the binder includes an organic polymer binder.

According to this black-matrix-equipped filter, the light shielding layer is formed by dispersing metal microparticles in the binder to be able to shield light. An organic polymer binder is used as the binder serving as a binding agent. An example of the organic polymer binder is gelatin having a protective colloidal property.

(8) The black-matrix-equipped filter according to any one of the items (5) to (7), wherein the metal microparticles include one of silver and a compound containing silver.

According to this black-matrix-equipped filter, the metal microparticles are made of silver or a compound containing silver. Thus, excellent malleability and ductility are obtained. Consequently, a high-density high-precision (or high-resolution) light shielding layer can easily be print-formed at low cost.

(9) According to a second aspect of the present invention, a liquid crystal display includes: a black-matrix-equipped filter according to the item (1); a backlight light source that is disposed at a light introduction side of the black-matrix-equipped filter; and a liquid crystal panel that is disposed between the black-matrix-equipped filter and the backlight light source.

According to this liquid crystal display, when light having been incident from the light introduction side impinges upon the black matrix of the black-matrix-equipped filter, the incident light is inhibited by the first reflection inhibition layer formed at the light introduction side of the light shielding layer from being reflected. Thus, an amount of reflection light irradiated onto the TFT provided on the liquid crystal panel is reduced.

(10) According to a third aspect of the present invention, a black-matrix-equipped filter includes a black matrix adapted to selectively shield light being incident from a light introduction side, and to transmit the unshielded light to a light output side, wherein the black matrix includes: a light shielding layer; and a retro-reflection layer formed at the light introduction side of the light shielding layer.

According to this black-matrix-equipped filter, when light having been incident from the light output side impinges upon the black matrix, the incident light is returned in a direction, which is the same as an incident direction, by the retroreflection layer formed at the light introduction side of the light shielding layer. That is, light having been incident from the light introduction side does not serve as internal reflection light (or stray light) that travels in a direction other than the incident direction. Consequently, in a case where a liquid crystal panel is disposed between the black-matrix-equipped filter and the backlight light source, light transmitted by the liquid crystal panel from the backlight light source is prevented from being reflected by the black matrix of the black-matrix-equipped filter and from being irradiated onto a TFT of the liquid crystal panel.

(11) The black-matrix-equipped filter according to the item (10), wherein the black matrix includes a reflection inhibition layer provided at the light output side of the light shielding layer.

According to this black-matrix-equipped filter, even in a case where the light shielding layer is a metal film, the high reflectance of the metal film is reduced by the reflection inhibition layer through formation of the reflection inhibition layer at the light output side of the light shielding layer. Thus, high display contrast can be obtained even under external light.

(12) The black-matrix-equipped filter according to the item (11), wherein the reflection inhibition layer includes a light absorbing material.

According to this black-matrix-equipped filter, the reflection inhibition layer is made of a light absorbing material. Thus, when external light is irradiated onto the black matrix, the irradiated light is partly absorbed by the light absorbing material and is attenuated during passing through the light absorbing material. The light reaching the light shielding layer without being absorbed is reflected. This reflection light is partly absorbed and is attenuated during passing through the light absorbing material again. Consequently, the external light irradiated onto the black matrix from the light output side is inhibited from being reflected.

(13) The black-matrix-equipped filter according to the item (12), wherein the light absorbing material is one of carbon black and a mixture including the carbon black.

According to this black-matrix-equipped filter, carbon black or a mixture including carbon black is used as the light absorbing material. Thus, fine carbon particles, which are 5 nm to 500 nm in diameter, are kneaded and applied. Consequently, a high-density high-precision (or high-resolution) light absorbing film can easily be formed at low cost.

(14) The black-matrix-equipped filter according to the item (10), wherein the light shielding layer includes metal microparticles.

According to this black-matrix-equipped filter, a film thickness is large, and a high light-shieldability can be obtained, as compared with the filter in which the black matrix includes carbon black.

(15) The black-matrix-equipped filter according to the item (14), wherein the light shielding layer is configured to disperse the metal microparticles in a binder to be able to shield light.

According to this black-matrix-equipped filter, a light shielding layer can be formed by simple coating to which a printing technique is applied.

(16) The black-matrix-equipped filter according to the item (15), wherein the binder includes an organic polymer binder.

According to this black-matrix-equipped filter, the light shielding layer is formed by dispersing metal microparticles in the binder to be able to shield light. An organic polymer binder is used as the binder serving as a binding agent. An example of the organic polymer binder is gelatin having a protective colloidal property.

(17) The black-matrix-equipped filter according to any one of the items (14) to (16), wherein the metal microparticles comprise one of silver and a compound containing silver.

According to this black-matrix-equipped filter, the metal microparticles are made of silver or a compound containing silver. Thus, excellent malleability and ductility are obtained. Consequently, a high-density high-precision (or high-resolution) light shielding layer can easily be print-formed at low cost.

(18) The black-matrix-equipped filter according to any one of the items (10) to (17), wherein the retro-reflection layer includes: a binding agent layer that is formed on a surface of the light shielding layer, the surface being provided at the light introduction side, and have the light absorbing material; and a large number of minute glass beads that are disposed on the binding agent layer, and that have a light refracting action.

According to this black-matrix-equipped filter, a light absorbing material is added to the binding agent layer on which the glass beads are disposed. When light having been incident from the light introduction side impinges upon the black matrix of the black-matrix-equipped filter, incident light having been incident on each of the glass beads is returned in an incident direction again. On the other hand, light having been incident on the binding agent layer is partly absorbed by the light absorbing material and is attenuated during passing through the light absorbing material. Consequently, light irradiated onto the black matrix from the light introduction side is inhibited from being reflected.

(19) According to a fourth aspect of the present invention, a liquid crystal display includes: a black-matrix-equipped filter according to any one of the items (10) to (18); a backlight light source that is disposed at a light introduction side of the black-matrix-equipped filter; and a liquid crystal panel that is disposed between the black-matrix-equipped filter and the backlight light source.

According to this black-matrix-equipped filter, when light having been incident from the light output side impinges upon the black matrix of the black-matrix-equipped filter, the incident light is returned by the retroreflection layer, which is formed at the light introduction side of the light shielding layer, in a direction which is the same as an incident direction. Thus, the incident light is prevented from serving as internal reflection light and from being irradiated onto a TFT provided on the liquid crystal panel.

The black-matrix-equipped filter according to the invention includes a black matrix adapted to selectively shield light, which is incident from a light introduction side, and to transmit the unshielded light to a light output side. This black matrix includes the light shielding layer and the first reflection inhibition layer formed at the light introduction side of the light shielding layer. Thus, when light having been incident from the light output side impinges upon the black matrix, the incident light is inhibited by the first reflection inhibition layer formed at the light introduction side of the light shielding layer from being reflected. Also, an internal reflection, by which the light having been incident from the light introduction side is outputted again from the light introduction side, can be prevented.

The black-matrix-equipped filter according to the invention includes a black matrix adapted to selectively shield light, which is incident from a light introduction side, and to transmit the unshielded light to a light output side. This black matrix includes the light shielding layer and the retroreflection layer formed at the light introduction side of the light shielding layer. Thus, when light having been incident from the light output side impinges upon the black matrix, the incident light is reflected in a direction, which is the same as an incident direction, by the retroreflection layer formed at the light introduction side of the light shielding layer. Thus, when light having been incident from the light output side impinges the black matrix, the incident light is reflected in a direction, which is the same as the incident direction, by the retroreflection layer formed at the light introduction side of the light shielding layer. Consequently, the light having been incident from the light introduction side can be prevented from serving as internal reflection light (or stray light).

The liquid crystal display according to the invention is configured so that the black-matrix-equipped filter is disposed opposite to the backlight light source across the liquid crystal panel. Thus, when light having been incident from the light output side impinges upon the black matrix of the black-matrix-equipped filter, the incident light is inhibited by the first reflection inhibition layer formed at the light introduction side of the light shielding layer from being reflected. Also, an amount of reflection light to be irradiated onto the TFT provided on the liquid crystal panel is reduced. Consequently, a malfunction of the TFT, which is caused by irradiating backlight light onto the TFT through the light shielding layer as internal reflection light, can be prevented. Also, the display quality of the liquid crystal panel can be enhanced.

The liquid crystal display according to the invention is configured so that the black-matrix-equipped filter is disposed opposite to the backlight light source across the liquid crystal panel. Thus, when light having been incident from the light output side impinges upon the black matrix of the black-matrix-equipped filter, the incident light is returned in the incident direction by the retroreflection layer formed at the light introduction side of the light shielding layer. Thus, the incident light neither serves as internal reflection light (or stray light) nor is irradiated onto a TFT provided on the liquid crystal panel. Consequently, a malfunction of the TFT, which is caused by irradiating backlight light onto the TFT through the light shielding layer as internal reflection light, can be prevented. Also, the display quality of the liquid crystal panel can be enhanced.

BRIEF DESCRIPTION OF THE DRAWINGS

The invention disclosed herein will be understood better with reference to the following drawings of which.

BEST MODE FOR CARRYING OUT THE INVENTION

First embodiment

Hereinafter, first embodiment of a black-matrix-equipped filter and a liquid crystal display according to the invention are described in detail with reference to the accompanying drawings.

Figure 1:
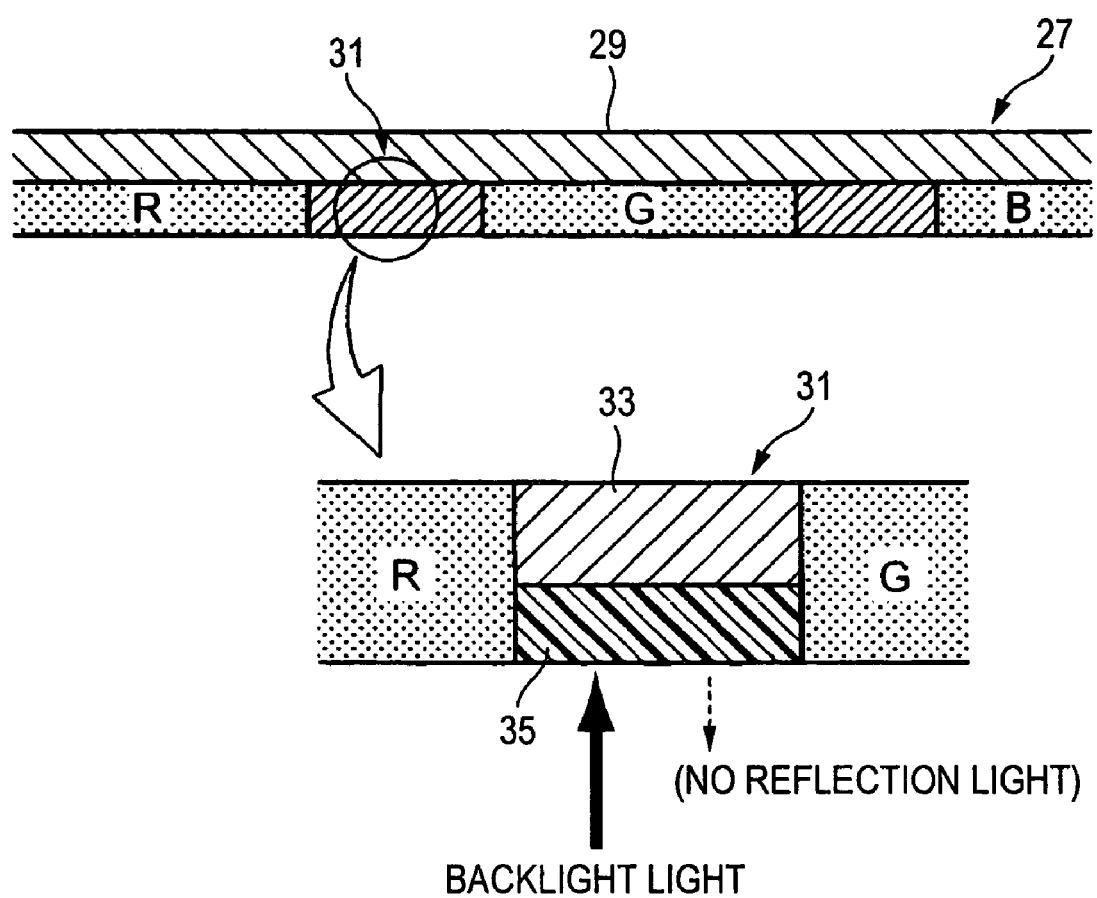
FIG. 1 is a grossly enlarged sectional diagram illustrating a primary part of a black-matrix-equipped filter according to the first embodiment.
Figure 2:
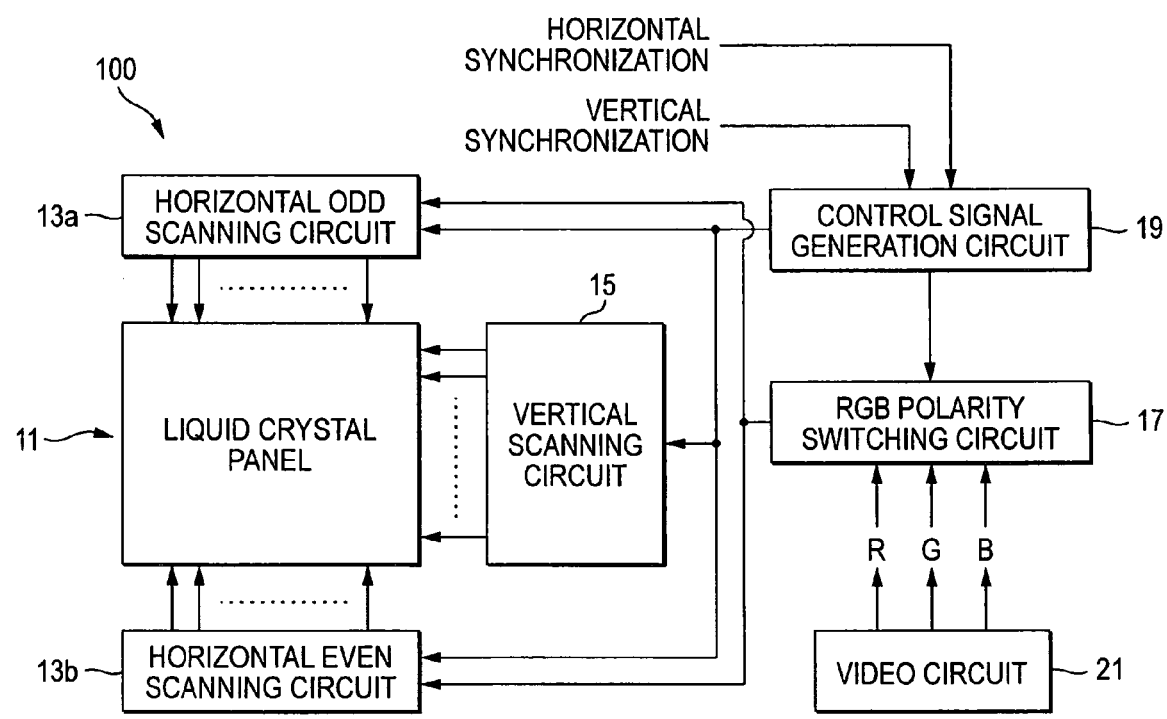
FIG. 2 is a block diagram illustrating an example of a liquid crystal display having the black-matrix-equipped filter shown in FIG. 1.
Figure 3:
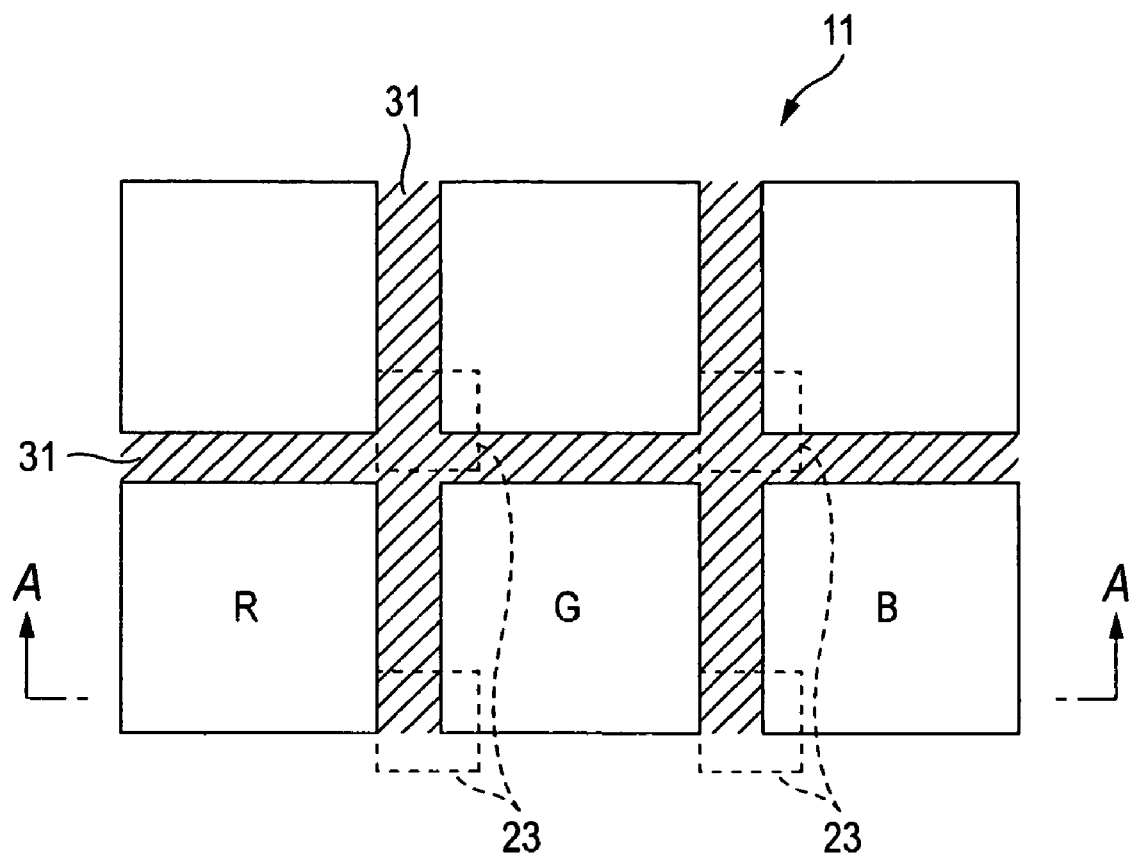
FIG. 3 is an enlarged top plan diagram illustrating a primary part of a liquid crystal panel shown in FIG. 2.
Figure 4:
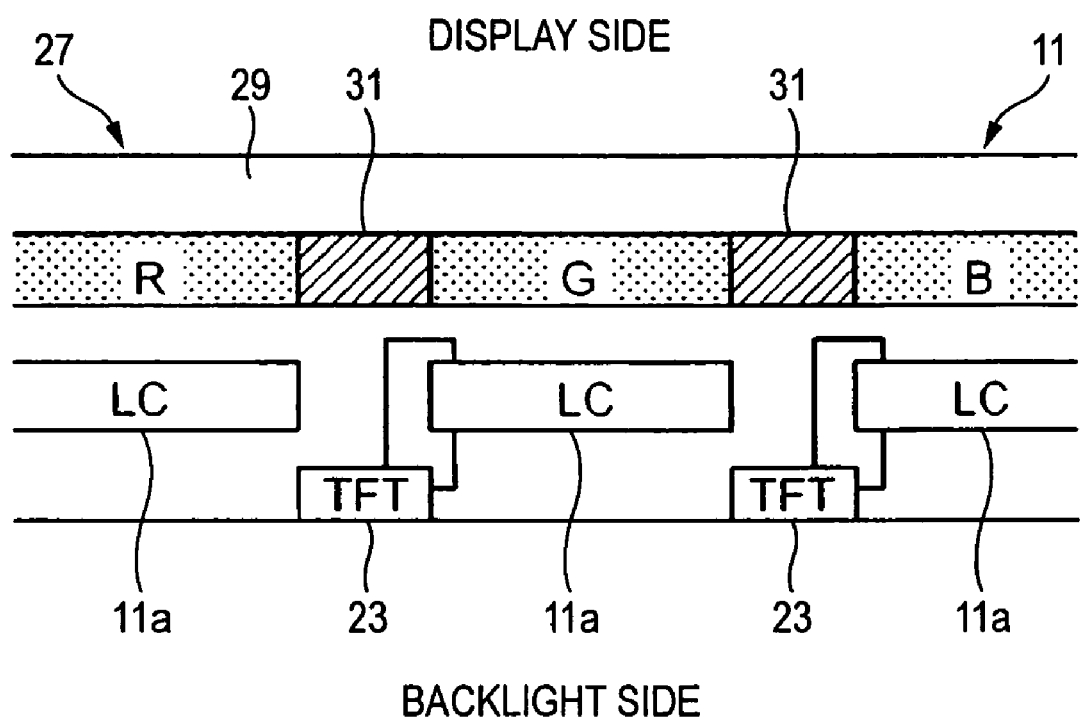
FIG. 4 is a cross-sectional diagram taken on line A-A in the direction of arrows shown in FIG. 3.
Figure 5:
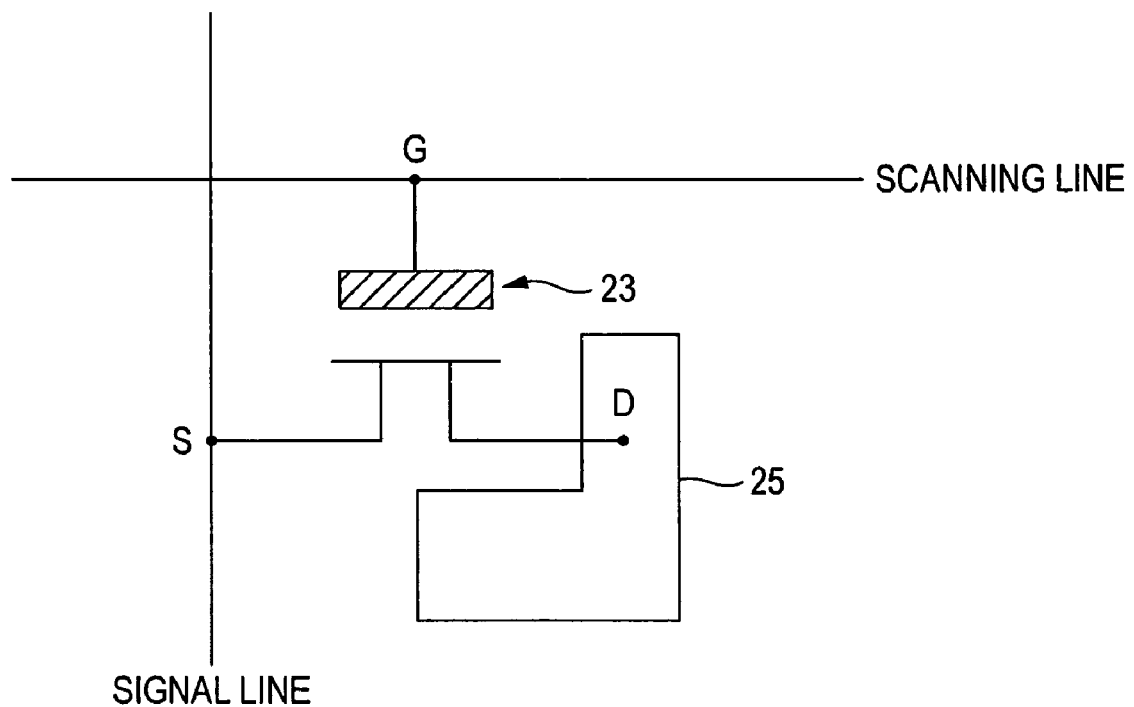
FIG. 5 is a schematic diagram illustrating the connection state of a TFT.

FIG. 1 is an explanatory diagram enlargedly illustrating a primary part of a black-matrix-equipped filter according to the invention. FIG. 2 is a block diagram illustrating an example of a liquid crystal display having the black-matrix-equipped filter shown in FIG. 1. FIG. 3 is a plan diagram enlargedly illustrating a primary part of a liquid crystal panel shown in FIG. 2. FIG. 4 is a cross-sectional diagram taken on line A-A in the direction of arrows shown in FIG. 3. FIG. 5 is a schematic diagram illustrating the connection state of a TFT.

As exemplified in FIG. 2, a liquid crystal display 100 is configured so that a horizontal odd scanning circuit 13a, a horizontal even scanning circuit 13b, and a vertical scanning circuit 15 are connected to a liquid crystal panel 11. An RGB polarity switching circuit 17 and a control signal generation circuit 19 are connected to each of the horizontal odd scanning circuit 13a and the horizontal even scanning circuit 13b. The control signal generation circuit 19 is connected to the vertical scanning circuit 15. Also, a horizontal synchronization signal and a vertical synchronization signal to the control signal generation circuit 19. R, G, and B signals are inputted from a video circuit 21 to the RGB polarity switching circuit 17.

According to the horizontal synchronization signal and the vertical synchronization signal, the control signal generation circuit 19 generates RGB signal voltages corresponding to the light on/off characteristic of the liquid crystal panel 11 and also generates RGB signals having positive and negative polarities to perform the AC drive of the liquid crystal panel 11. This prevents the characteristics of liquid crystals from being degraded by applying only an electric field, which acts only in a single direction, to the liquid crystal panel 11. The RGB signals are switched by the RGB polarity switching circuit 17 with timing corresponding to the number of pixels and are inputted to the horizontal odd scanning circuit 13a and the horizontal even scanning circuit 13b. On the other hand, the control signal voltage is applied to the vertical scanning circuit 15 from a top scanning line in series, as viewed in this figure. Thus, all TFTs 23 (see FIG. 3) connected to each scanning line, to which the control signal voltage is applied, are turned on. A signal voltage applied from the horizontal odd scanning circuit 13a or the horizontal even scanning circuit 13b to a pixel electrode 25 through the signal line shown in FIG. 5, a source S of the TFT 23, and a drain electrode D thereof. The applied signal voltage is stored in the pixel electrode 25, which serves as a capacitor, and continues to drive a liquid crystal 11a shown in FIG. 4, until the next scan is performed.

As shown in FIG. 4, the liquid crystal display 100 has a backlight light source 30 provided on one surface (the bottom surface shown in FIG. 4) of the liquid crystal panel 11 and also has a black-matrix-equipped filter 27 provided on the other surface (the top surface shown in FIG. 4) thereof. That is, the backlight light source 30 is disposed at the light introduction side of the black-matrix-equipped filter 27. The liquid crystal panel 11 is disposed between the black-matrix-equipped filter 27 and the backlight light source 30.

A light source of an appropriate configuration, for example, a light source utilizing light outputted from a cold cathode ray tube or an LED through a prism as flat light can be utilized as the backlight light source.

The black-matrix-equipped filter 27 is configured so that colored pixel layers R, G, and B (respectively corresponding to red, green, and blue) are formed on a transparent substrate 29 (that is, on the bottom surface shown in FIG. 4), and that a black matrix 31 is formed in the gap between each of adjacent pairs of the colored pixels R, G, and B to enhance display contrast. The black-matrix-equipped filter 27 has a black matrix, so that light having been incident from the light introduction side is selectively shielded and that the unshielded light is transmitted to the light output side.

Incidentally, the black matrix 31 includes a light shielding layer 33 and a first reflection inhibition layer 35 formed at the light introduction side of this light shielding layer 33, as shown in FIG. 1. The light shielding layer 33 is formed using a colored composition for producing a black matrix (hereunder sometimes referred to simply as the "colored composition"). The colored composition consists of or includes metal microparticles. The colored composition may further contain a polymer serving as a binder, and a solvent. In a case where the light shielding layer 33 consists of metal microparticles, the light shielding layer 33 has a large film thickness and a high light shieldability, as compared with the black matrix including carbon black. Additionally, in a case where the light shielding layer 33 is formed by dispersing metal microparticles in a binder to be able to shield light, the formation of the light shielding layer 33 can be achieved by performing the simple application of the binder utilizing a printing technique. Additionally, in the case where the light shielding layer 33 is formed by dispersing metal microparticles in a binder to be able to shield light, an organic polymer binder can be used as a binder serving as a binding agent. For example, a gelatin having the property of a protective colloid can be employed as the organic polymer binder.

For instance, silver microparticles, microparticles made of compound including silver, gold microparticles, and copper microparticles are used as the metal microparticles. Although commercially available metal microparticles can be used, metal microparticles can be prepared by performing a chemical reduction method or a nonelectrolytic plating method on metal ions or by performing a metal vaporization method. In a case where the metal microparticles are silver ones (or colloidal silver), the following conventionally known methods can be employed, which include methods of chemically reducing silver ions in a solution to silver, for example, a method of chemically reducing a soluble silver salt in a gelatin aqueous solution using hydroquinone, as described in the specification of the U.S. Pat. No. 2,688,601, a method of reducing a slightly-soluble silver salt using hydrazine, as described in the specification of the Germany Patent No. 1,096,193, and a method of reducing silver ions to silver using a tannin acid, as described in the U.S. Pat. No. 2,921,914. Also, the conventionally known methods include a method of forming silver microparticles by performing a nonelectrolytic plating method, as described in JP-A-5-134358, and a gas evaporation method of evaporating a bulk metal in an inactive gas, such as a helium gas, and then performing cold-trapping using a solvent. Especially, in a case where metal microparticles are made of silver or a compound containing silver, excellent malleability and ductility are obtained. Consequently, a high-density high-precision (or high-resolution) light shielding layer can easily be print-formed at low cost.

Also, in a case where the light shielding layer 33 is formed using a colored composition, it is preferable that the optical density (O.D.) per μm of the thickness of the light shielding layer 33 is equal to or higher than 1. In consideration of prevention of fusion of metal microparticles in a heating step at production of the black-matrix-equipped filter, preferably, the content of metal microparticles in the colored composition is adjusted so that the content of the metal microparticles contained in the light shielding layer 33 to be formed is 10 percent by mass to 90 percent by mass, more preferably, 10 percent by mass to 80 percent by mass or so. Incidentally, even when the content of metal microparticles contained in the light shielding layer 33 has the same value, the obtained optical density thereof varies with the average particle diameter of the metal microparticles.

From a viewpoint of the optical density of the light shielding layer 33, preferably, the average particle diameter of the metal microparticles used in the colored composition ranges from 60 nm to 250 nm, more preferably, from 70 nm to 200 nm. The average particle diameter of the metal microparticles is an average value of diameters of 50 microparticles measured according to observation using a transmission electron microscope (TEM).

The colored composition may have photosensitivity. To impart photosensitivity to the colored composition, a photosensitive resin composition is added to the colored composition. Compositions described in paragraphs Nos. 0016 to 0022 and 0029 of JP-A-10-160926 can be used as the photosensitive resin composition. In a case where metal microparticles are used as an aqueous dispersoid, similarly to silver colloid, a water-based composition is needed as the photosensitive resin composition. Such photosensitive resin compositions are described in paragraphs Nos. 0015 to 0023 of JP-A-8-271727. Additionally, a commercially available photosensitive resin composition is, for example, "SPP-M20" (trade name) manufactured by Toyo Gosei Co., Ltd. The light shielding layer 33, which is a thin film and has a high optical density, can be manufactured from these colored compositions (including photosensitive compositions).

Also, a photosensitive transfer material is manufactured using the photosensitive colored composition. Then, the light shielding layer 33 can be manufactured using this photosensitive transfer material. The photosensitive transfer material is adapted to employ at least a photosensitive colored composition as a support medium, and to have a photosensitive light shielding layer. Thus, a photosensitive light shielding layer is provided as the light shielding layer. Preferably, the film thickness of the photosensitive light shielding layer is about 0.25 μm. Preferably, the support medium is made of a flexible material that is chemically and thermally stable. More specifically, thin sheets made of Teflon (registered trademark), polyethylene terephthalate, polyethylene naphthalate, polyalylate, polycarbonate, polyethylene, and polypropylene, or laminated products made of these materials are preferable for the material of the support medium. Additionally, in a case where an alkali-soluble thermoplastic layer is provided, it is preferable that the peelability between this layer and the supporting medium is good. The appropriate thickness of the support medium ranges from 5 μM to 30 μm, especially preferably, 20 μm to 150 μm.

The photosensitive transfer material can be manufactured by applying and drying a solution of a colored photosensitive composition to the support medium using a coater, such as a spinner, a whiler, a roller coater, a curtain coater, a knife coater, a wire bar coater, or an extruder. In the case where an alkali-soluble thermoplastic layer is provided, the photosensitive transfer material is similarly manufactured. Because the photosensitive transfer material is provided with the photosensitive light shielding layer manufactured from the colored composition, the light shielding layer 33, which is a thin film and has a high optical density, can be manufactured.

Thus, the black matrix 31 has the light shielding layer 33 manufactured using the colored composition or the photosensitive transfer material. Preferably, the film thickness of the light shielding layer 33 is about 0.25 μm. The light shielding layer 33 of the black matrix 31 is formed by dispersing metal microparticles. Thus, even when the light shielding layer 33 is a thin film, the light shielding layer 3 has a sufficient optical density.

A method of manufacturing the light shielding layer 33 using a photosensitive colored composition is performed as follows. That is, first, a layer formed by applying a photosensitive colored composition containing metal microparticles onto an optical transparent substrate (using the method of applying the photosensitive colored composition, which is similar to that used when the photosensitive transfer material is manufactured) is exposed through a photomask for a black matrix by an ordinary method. Subsequently, development is performed on the exposed layer. Alternatively, in a case where the colored composition is not photosensitive, a layer formed of a photosensitive resin composition, which can be developed, is formed on a layer formed by applying a colored composition containing metal microparticles on an optical transparent substrate. Then, the layer formed of a photosensitive resin composition is exposed by an ordinary method through a photomask for a black matrix. Subsequently, development and etching are performed thereon. Thus, the light shielding layer 33 is formed.

A method of manufacturing the light shielding layer 33 using a photosensitive transfer material is performed as follows. First, the photosensitive transfer material is placed and stacked on the optical transparent substrate so that the photosensitive light shielding layer of the photosensitive transfer material is in contact therewith. Next, the support medium is peeled off a laminated body of the photosensitive transfer material and the optical transparent substrate. Subsequently, the layer formed of the photosensitive transfer material is exposed through a photomask for a black matrix. Then, development is performed on the exposed layer. Thus, the light shielding layer 33 is formed. This method of manufacturing the light shielding layer 33 can be achieved without performing a complicated process at low cost.

The first reflection inhibition layer 35 formed at the light introduction side of the light shielding layer 33 contains a light absorbing material. The light absorbing material may be carbon black or a mixture containing carbon black. The first reflection inhibition layer 35 can be formed by exposing and developing a coating layer obtained by applying a photosensitive resin composition, which contains carbon black, and drying the applied composition. The thickness of the first reflection inhibition layer 35 can be set at about 0.25 mm, which is nearly equal to that of, for example, the light shielding layer 33.

In the black matrix 31, the first reflection inhibition layer 35 formed at the light introduction side is made of a light absorbing material. Thus, when light coming from, for example, the backlight light source is irradiated from the light introduction side onto the black matrix 31, the irradiated light is absorbed by the light absorbing material and is attenuated during passing through the light absorbing material. The light reaching the light shielding layer 33 without being absorbed is reflected. This reflection light is partly absorbed and is attenuated during passing through the light absorbing material again. Consequently, most of the light irradiated onto the black matrix 31 from the light introduction side is inhibited from being reflected.

Also, carbon black or a mixture including carbon black is used as the light absorbing material. Thus, fine carbon particles, which are 5 nm to 500 nm in diameter, are kneaded and applied. Consequently, a high-density high-precision (or high-resolution) light absorbing film (the first reflection inhibition layer 35) can easily be formed at low cost.

Figure 6:
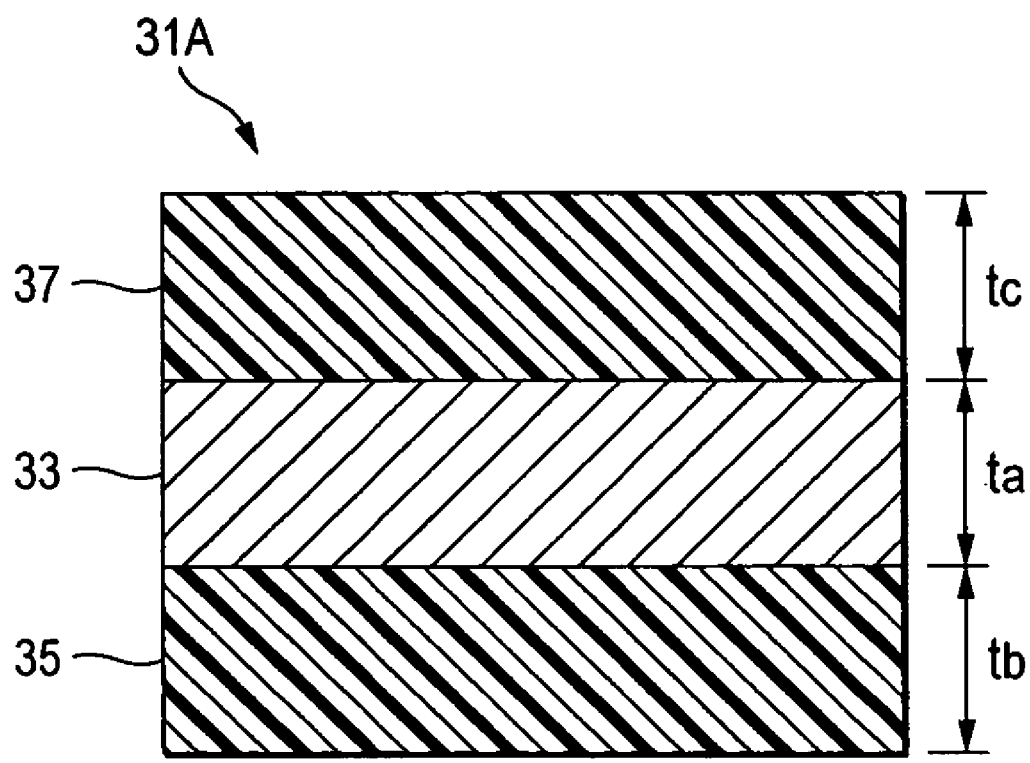
FIG. 6 is a cross-sectional diagram illustrating a modification of a black matrix in the first embodiment.
Figure 7:
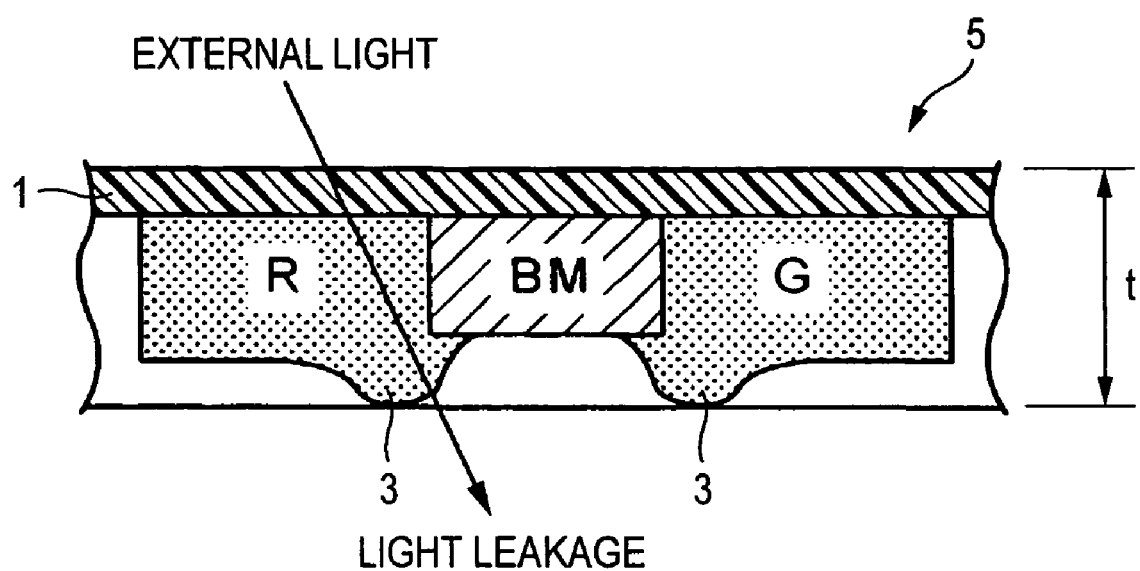
FIG. 7 is an enlarged cross-sectional diagram illustrating a black-matrix-equipped filter in which a conventional black matrix is formed using carbon black in the first embodiment.

FIG. 6 is a cross-sectional diagram illustrating a modification of the black matrix.

As shown in FIG. 6, the black matrix 31 may have a second reflection inhibition layer 37 at the light output side of the light shielding layer 33. In this case, the thickness of the second reflection inhibition layer 37 can be set at, for example, about 0.25 μm, which is nearly equal to that of the light shielding layer 33. Therefore, in the case of a black matrix 31A according to this modification, a total film thickness of a film thickness ta of the light shielding layer 33, a film thickness tb of the first reflection inhibition layer 35, and a film thickness tc of the second reflection inhibition layer 37 is about 0.75 μm. As compared with a thickness of about 1.25 μm in the case of assuring a similar optical density (O.D.) by the black matrix formed using only carbon black, substantial reduction in the thickness of the black matrix can be achieved. Also, even in a case where the light shielding layer 33 is a metal film, the high reflectance of the metal film can be reduced by the second reflection inhibition layer 37 by forming the second reflection inhibition layer 37 at the light output side of the light shielding layer 33. Thus, high display contrast can be obtained even under external light.

The black-matrix-equipped filter 27 having the black matrix 31 is configured so that when light having been incident from the light output side impinges upon the black matrix 31, the incident light is inhibited by the first reflection inhibition layer 35 formed at the light introduction side of the light shielding layer 33 from being reflected. That is, an internal reflection, by which light having been incident from the light introduction side is again outputted from the light introduction side, is inhibited. Consequently, in a case where the liquid crystal panel 11 is provided between the black-matrix-equipped filter 27 and the backlight light source, light transmitted by the liquid crystal panel 11 from the backlight light source is inhibited from being reflected by the black matrix 31 of the black-matrix-equipped filter 27 and from being irradiated onto the TFT 23 of the liquid crystal panel 11. Therefore, in the liquid crystal display 100 having the black-matrix-equipped filter 27, when light having been incident from the light output side impinges upon the black matrix 31, the incident light is inhibited by the first reflection inhibition layer 35 from being reflected. Thus, an amount of reflection light irradiated onto the TFT 23 provided on the liquid crystal panel 11 is reduced.

Thus, the black-matrix-equipped filter 27 according to the above embodiment includes the black matrix 31 adapted to selectively shield light, which is incident from a light introduction side, and to transmit the unshielded light to a light output side. This black matrix 31 includes the light shielding layer 33 and the first reflection inhibition layer 35 formed at the light introduction side of the light shielding layer 33. Thus, when light having been incident from the light output side impinges upon the black matrix 31, the incident light is inhibited by the first reflection inhibition layer 35 formed at the light introduction side of the light shielding layer 33 from being reflected. Also, an internal reflection, by which the light having been incident from the light introduction side is outputted again from the light introduction side, can be prevented.

Also, the liquid crystal display 100 using the black-matrix-equipped filter 27 is configured so that the black-matrix-equipped filter 27 is disposed opposite to the backlight light source across the liquid crystal panel 11. Thus, when light having been incident from the light output side impinges upon the black matrix 31 of the black-matrix-equipped filter 27, the incident light is inhibited by the first reflection inhibition layer 35 formed at the light introduction side of the light shielding layer 33 from being reflected. Also, an amount of reflection light to be irradiated onto the TFT 23 provided on the liquid crystal panel 11 is reduced. Consequently, a malfunction of the TFT 23, which is caused by irradiating backlight light onto the TFT 23 through the light shielding layer 33 as internal reflection light, can be prevented. Also, the display quality of the liquid crystal panel 11 can be enhanced.

Second Embodiment

Hereinafter, first embodiment of a black-matrix-equipped filter and a liquid crystal display according to the invention are described in detail with reference to the accompanying drawings. With reference to the second embodiment, in which parts similar to those previously described with reference to the first embodiment are denoted by the same reference numerals.

Figure 8:
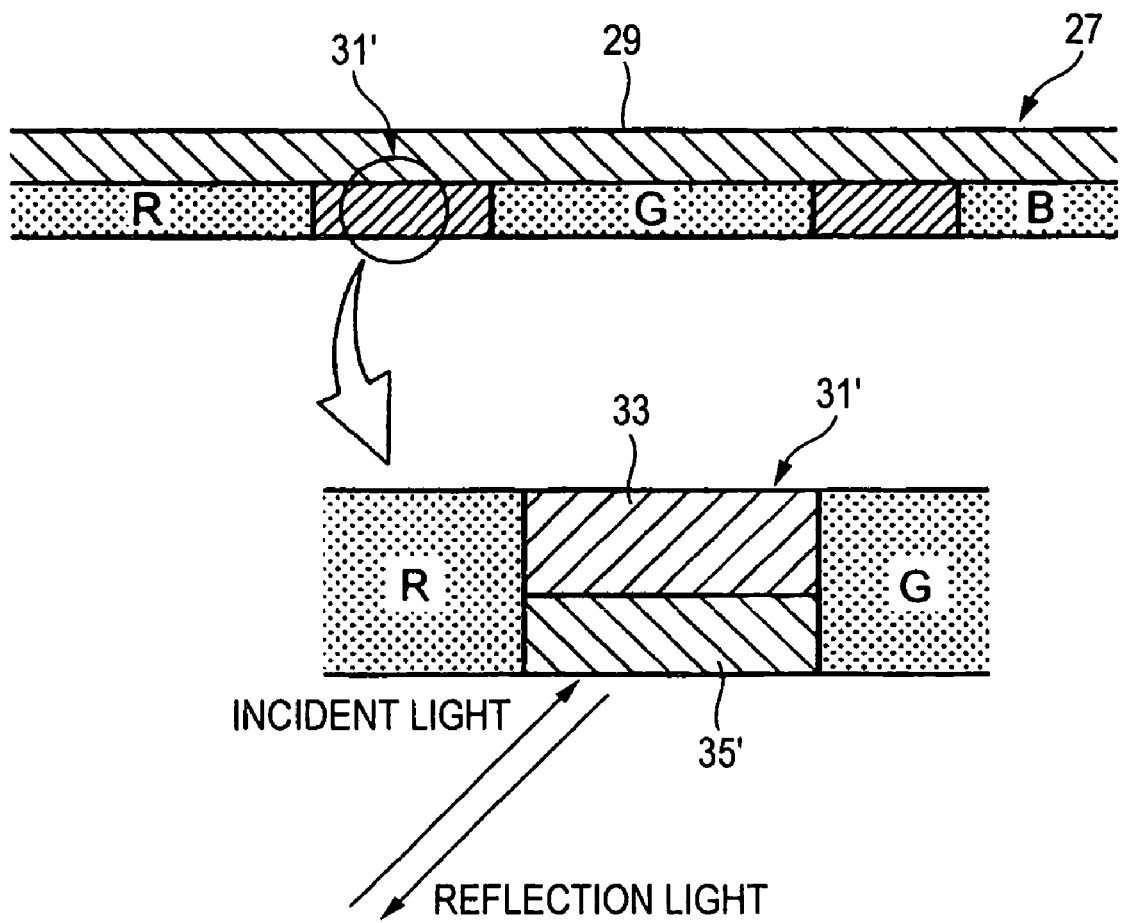
FIG. 8 is a grossly enlarged sectional diagram illustrating a primary part of a black-matrix-equipped filter according to the second embodiment.
Figure 9:
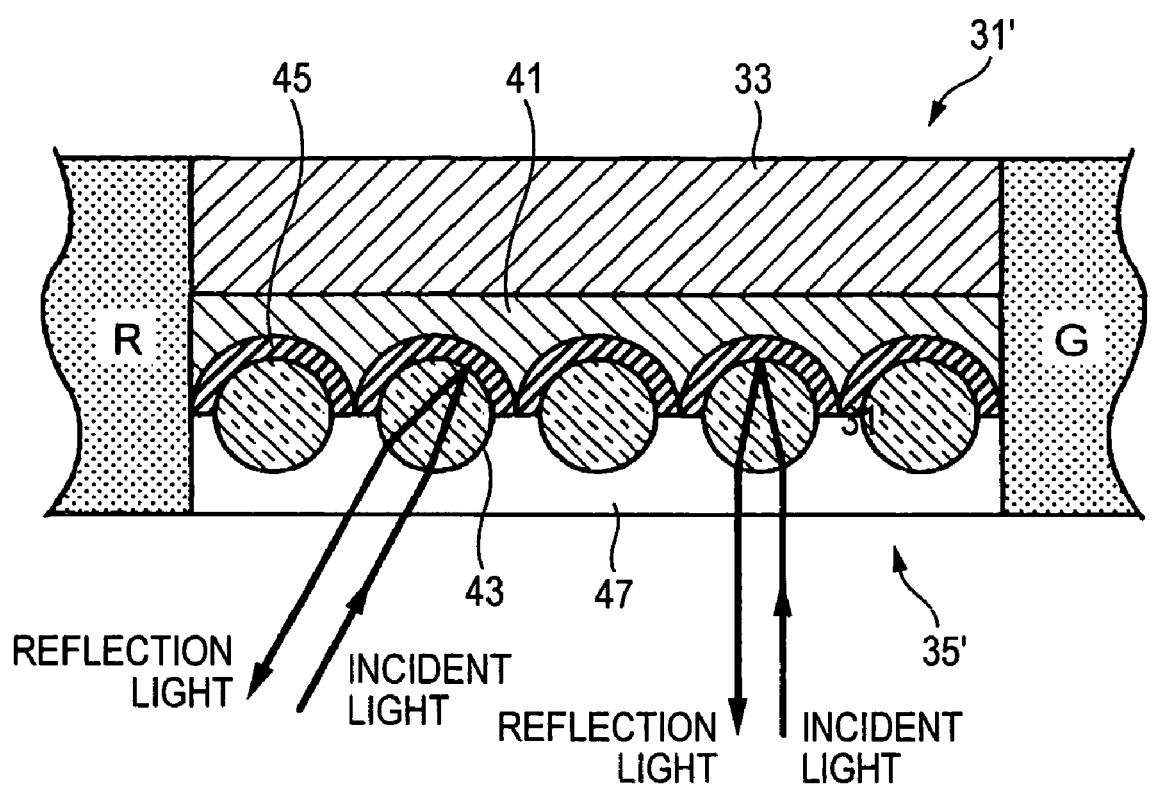
FIG. 9 is an enlarged cross-sectional diagram illustrating a retro-reflection layer shown in FIG. 8.

FIG. 8 is an explanatory diagram enlargedly illustrating a primary part of a black-matrix-equipped filter according to the second embodiment. FIG. 9 is a schematic diagram illustrating the connection state of a TFT.

Incidentally, the black matrix 31' includes a light shielding layer 33 and a retro-reflection inhibition layer 35' formed at the light introduction side of this light shielding layer 33, as shown in FIG. 8.

As shown in FIG. 9, the retro-reflection layer 35' formed at the light introduction side of the light shielding layer 33 includes a binding agent layer 41 formed on a surface at the side of the light introduction side of the light shielding layer 33, and also includes a large number of minute glass beads 43 disposed on the binding agent layer 41, which have a light refracting action. Preferably, a light absorbing material, such as carbon black, is added to the binding agent layer 41, as will be described later. Glass beads 43, the whole sphere of each of which is plated with, for example, aluminum, are used in a process of manufacturing the retro-reflection layer 35'. A plasma ion plating method with good productivity is employed as a method of plating the whole sphere of each of the glass beads 43 (see, for example, JP-A-2000-336473).

A method of forming the retro-reflection layer 35' is performed as follows. First, the binding agent layer 41, which is an adhesive agent layer, is formed at the light introduction side of the light shielding layer 33 by screen-printing. A large number of polymer materials can be used as a binding agent used in the binding agent layer 41. More specifically, thermoset materials and thermoplastic materials are used as the binding agent. Appropriate polymer materials are, for example, urethane, epoxy resins, alkyd resins, acrylate resins, and acid olefin copolymer (for example, ethylene methacrylic acids and polyvinyl chloride-polyvinyl acetate copolymers). Other typical examples of the binding agent are polyvinyl butyl, polyester resins, alkyd resins, acrylate resins, and combinations thereof.

Subsequently, the glass beads 43, the whole sphere of each of which is plated with a metal such as aluminum 45, are disperse-placed on the applied binding agent layer 41. The glass beads 43 can be disperse-placed by applying a coating material, to which the glass beads 43 are added, thereto through screen-printing. However, the method of disperse-placing the glass beads 43 according to the invention is not limited thereto. The glass beads 43 may be disperse-placed directly thereon. Consequently, each of the glass beads 43 is embedded in the binding agent layer 41 by a hemisphere. Although a step of pushing the disperse-placed glass beads 43 into the binding agent layer 41 may be needed, the glass beads 43 can be pushed thereinto by spontaneous sedimentation due to the difference in specific gravity between the glass bead 43 and the binding agent layer 41. Subsequently, after the binding agent layer 41 is dried and solidified, a metallic film (made of aluminum 45), with which the exposed hemisphere of each of the glass beads 43 is coated, is dissolved or peeled by an alkaline aqueous solution. Thereafter, the glass beads 43 are washed and dried. Subsequently, a protection layer 47 is formed so that the metal film peeled part of each of the glass beads 43 is embedded thereinto. Thus, the retro-reflection layer 35', into which the glass beads 43 are embedded, is formed.

Additionally, preferably, a light absorbing material is added to the binding agent layer 41, in which the glass beads 43 are placed. Carbon black may be used as the light absorbing material. When light having been incident from the light introduction side impinges upon the retro-reflection layer 35' obtained by adding the light absorbing material to the binding agent layer 41, the incident light having been incident on each of the glass beads 43 is returned in an incident direction. On the other hand, the incident light having been incident on the binding agent layer 41 is partly absorbed by the light absorbing material and is attenuated during passing through the light absorbing material. Consequently, light irradiated from the light introduction side onto the retro-reflection layer 35' is inhibited from being reflected.

Figure 10:
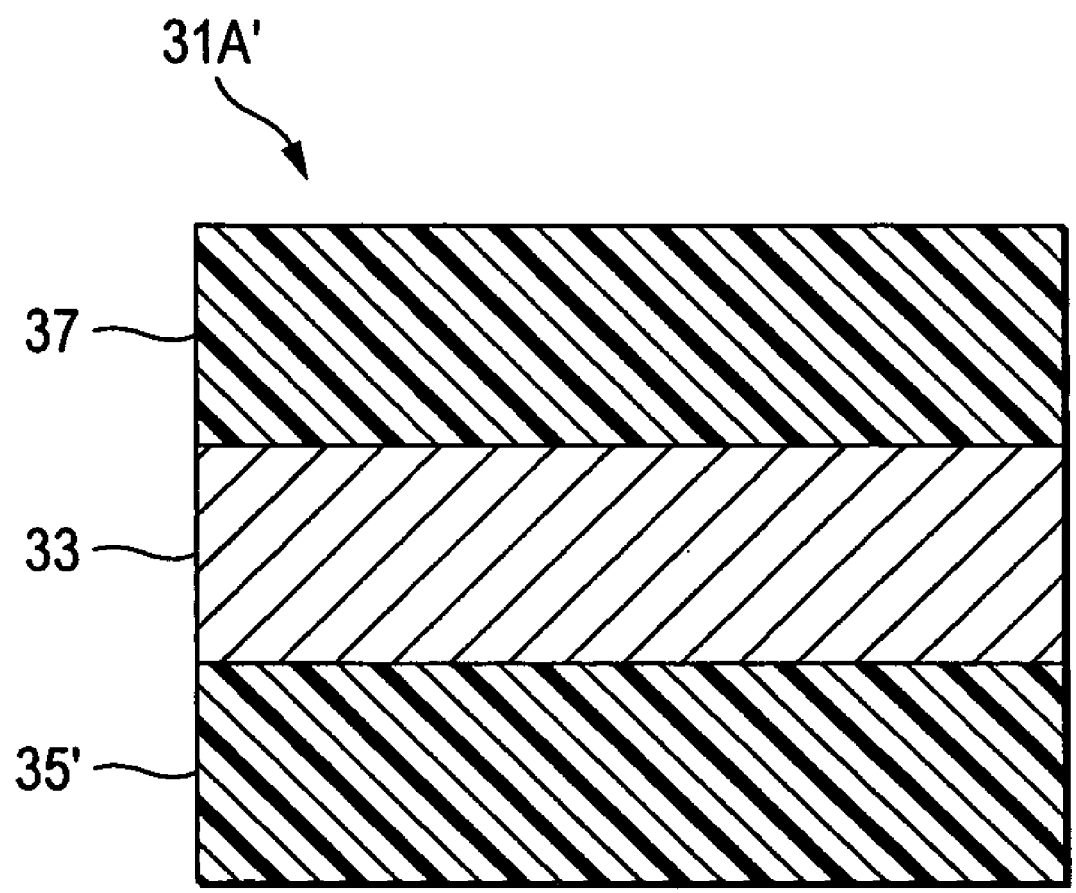
FIG. 10 is a cross-sectional diagram illustrating a modification of a black matrix in the second embodiment.

FIG. 10 is a cross-sectional diagram illustrating a modification of the black matrix in the second embodiment.

As shown in FIG. 10, the black matrix 31 may have a reflection inhibition layer 37 at the light output side of the light shielding layer 33. In this case, the thickness of the reflection inhibition layer 37 can be set at, for example, about 0.25 μm. The reflection inhibition layer 37 contains a light absorbing material. The light absorbing material may be carbon black or a mixture containing carbon black. The retro-reflection layer 35' can be formed by applying and drying a photosensitive resin composition containing carbon black, and exposing and developing the applied layer having been dried. Also, carbon black or a mixture including carbon black is used as the light absorbing material contained in the reflection inhibition layer 37. Thus, fine carbon particles, which are 5 nm to 500 nm in diameter, are kneaded and applied. Consequently, a high-density high-precision (or high-resolution) light absorbing film (the retro-reflection layer 35') can easily be formed at low cost.

In the black matrix 31', when light having been incident from the light introduction side impinges upon the black matrix 31', the incident light is returned by the retro-reflection layer 35' formed at the light introduction side of the light shielding layer 33 in a direction, which is the same as an incident direction. That is, light having been incident from the light introduction side does not serve as harmful internal reflection light (or stray light) that travels in a direction other than the incident direction. Consequently, in a case where the liquid crystal panel 11 is disposed between the black-matrix-equipped filter 27 and the backlight light source, light transmitted by the liquid crystal panel 11 from the backlight light source is prevented from being reflected by the black matrix 31' of the black-matrix-equipped filter 27 and from being irradiated onto a TFT 23 of the liquid crystal panel 11.

Also, the reflection inhibition layer 37 is formed at the light output side of the black matrix 31'. Thus, when external light is irradiated from the light output side to the black matrix 31, the irradiated light is partly absorbed by the light absorbing material and is attenuated during passing through the light absorbing material. Additionally, the light reaching the light shielding layer without being absorbed is reflected. This reflection light is partly absorbed and is attenuated during passing through the light absorbing material again. Consequently, even in a case where the light shielding layer 33 is a metal film, the high reflectance of the metal film is reduced by the reflection inhibition layer 37 through the formation of the reflection inhibition layer at the light output side of the light shielding layer 33. Thus, high display contrast can be obtained even under external light.

The black-matrix-equipped filter 27 according to the above embodiment of the invention includes the black matrix 31' adapted to selectively shield light, which is incident from the light introduction side, and to transmit the unshielded light to the light output side. This black matrix 31' includes the light shielding layer 33 and the retro-reflection layer 35' formed at the light introduction side of the light shielding layer 33. Thus, when light having been incident from the light output side impinges upon the black matrix 31', the incident light is reflected in a direction, which is the same as an incident direction, by the retro-reflection layer 35' formed at the light introduction side of the light shielding layer 33. Thus, when light having been incident from the light output side impinges the black matrix 31', the incident light is reflected in a direction, which is the same as the incident direction, by the retro-reflection layer 35' formed at the light introduction side of the light shielding layer. Consequently, the light having been incident from the light introduction side can be prevented from serving as internal reflection light (or stray light).

Also, the liquid crystal display 100' using the black-matrix-equipped filter 27 is configured so that the black-matrix-equipped filter 27 is disposed opposite to the backlight light source across the liquid crystal panel 11. Thus, when light having been incident from the light output side impinges upon the black matrix 31' of the black-matrix-equipped filter 27, the incident light is returned in the incident direction by the retro-reflection layer 35' formed at the light introduction side of the light shielding layer 33. Thus, the incident light neither serves as internal reflection light nor is irradiated onto the TFT 23 provided on the liquid crystal panel 11. Consequently, a malfunction of the TFT 23, which is caused by irradiating backlight light onto the TFT 23 through the light shielding layer 33 as internal reflection light, can be prevented. Also, the display quality of the liquid crystal panel 11 can be enhanced.

The present application claims foreign priority based on Japanese Patent Application (JP 2005-368325) filed Dec. 21, 2005, Japanese Patent Application (JP 2005-370313) filed Dec. 22, 2005, the contents of which is incorporated herein by reference.

The invention claimed is:

1. A black-matrix-equipped filter comprising a black matrix adapted to selectively shield light being incident from a light introduction side, and to transmit the unshielded light to a light output side,
   wherein
   the black matrix comprises:
   a light shielding layer; and
   a retro-reflection layer formed at the light introduction side of the light shielding layer.

2. The black-matrix-equipped filter according to claim 1, wherein the black matrix comprises a reflection inhibition layer provided at the light output side of the light shielding layer.

3. The black-matrix-equipped filter according to claim 2, wherein the reflection inhibition layer comprises a light absorbing material.

4. The black-matrix-equipped filter according to claim 3, wherein the light absorbing material is one of carbon black and a mixture including carbon black.

5. The black-matrix-equipped filter according to claim 1, wherein the light shielding layer comprises metal microparticles.

6. The black-matrix-equipped filter according to claim 5, wherein the light shielding layer is configured to disperse the metal microparticles in a binder to be able to shield light.

7. The black-matrix-equipped filter according to claim 6, wherein the binder comprises an organic polymer binder.

8. The black-matrix-equipped filter according to claim 5, wherein the metal microparticles comprise one of silver and a compound containing silver.

9. The black-matrix-equipped filter according to claim 1, wherein
   the retro-reflection layer comprises:
   a binding agent layer that is formed on a light introduction side surface of the light shielding layer, wherein the binding agent layer comprises a light absorbing material; and
   a large number of minute glass beads that are disposed on the binding agent layer, and that have a light refracting action.

10. A liquid crystal display comprising:
    a black-matrix-equipped filter according to claim 1;
    a backlight light source that is disposed at a light introduction side of the black-matrix-equipped filter; and
    a liquid crystal panel that is disposed between the black-matrix-equipped filter and the backlight light source.

* * * * *